United States Patent [19]
Lewis et al.

[11] Patent Number: 5,920,194
[45] Date of Patent: Jul. 6, 1999

[54] DEVICE FOR LOCATING OBJECTS THAT EMIT ELECTROMAGNETIC SIGNALS

[75] Inventors: Andrew B Lewis, Bristol; John R Cottle, Melksu Am; Graham R Cooper, Trowbridge, all of United Kingdom

[73] Assignee: Radiodetection Limited, Bristol, United Kingdom

[21] Appl. No.: 08/737,060

[22] PCT Filed: May 9, 1995

[86] PCT No.: PCT/GB95/01042

§ 371 Date: Nov. 4, 1996

§ 102(e) Date: Nov. 4, 1996

[87] PCT Pub. No.: WO95/30913

PCT Pub. Date: Nov. 16, 1995

[30] Foreign Application Priority Data

May 6, 1994 [GB] United Kingdom .................. 9409003

[51] Int. Cl.⁶ ................ G01V 3/11; G01V 3/08
[52] U.S. Cl. ................ 324/326; 324/67
[58] Field of Search ............... 324/327, 326, 324/329, 328, 345, 66, 67

[56] References Cited

U.S. PATENT DOCUMENTS

| | | | |
|---|---|---|---|
| 3,281,660 | 10/1966 | Studenick | 324/326 |
| 3,617,865 | 11/1971 | Hakata | 324/326 |
| 4,130,791 | 12/1978 | Slough et al. | 324/326 |
| 4,387,340 | 6/1983 | Peterman | 324/326 |
| 4,390,836 | 6/1983 | Bruce et al. | 324/326 |
| 4,542,344 | 9/1985 | Darilek et al. | 324/325 |
| 4,672,321 | 6/1987 | Howell | 324/67 |
| 4,686,454 | 8/1987 | Pecukonis | 324/67 |
| 5,014,008 | 5/1991 | Flowerdew | 324/326 |
| 5,197,812 | 3/1993 | Yokoi | 324/67 |
| 5,371,959 | 12/1994 | Ahs | 324/326 |
| 5,438,265 | 8/1995 | Eslambolchi et al. | 324/326 |

*Primary Examiner*—Jay M. Patidar
*Attorney, Agent, or Firm*—Woodbridge & Associates

[57] ABSTRACT

A locator such as a ground penetration probe (24) has spaced antennae (21,22,23) therein which detect electromagnetic signals from an object (26) such as a buried cable. By analyzing the electromagnetic signals using a suitable processor (25) it is possible to determine the separation of the locator and object (26), both in terms of the direction (X) corresponding to the spacing of the antennae (21,22,23) and the perpendicular direction (Y) to the object (26). This then permits a display to be generated showing visually the separation of the locator and the object (26). If the locator incorporates a tilt sensor, the processor (25) can then compensate for tilting of the locator, and determine the vertical and horizontal separation of the locator and the object (26). A confidence measurement may be obtained by measuring the separation of the locator and object (26) at one position, predicting the separation of the locator and object (26) at a second position, and comparing the predicted and measured separations.

18 Claims, 9 Drawing Sheets

DEVICE FOR LOCATING OBJECTS THAT EMIT ELECTROMAGNETIC SIGNALS

BACKGROUND OF THE INVENTION

1. Field of the Invention

The present invention relates to a locator for locating a conductive object. It is particularly, but not exclusively, concerned with a locator for locating an underground conductor such as a buried cable or pipe.

2. Summary of the Prior Art

The proliferation of networks of buried cables and pipes for many different utilities (electricity, gas, telecommunications, etc) has meant that any excavation of the ground is likely to be in the vicinity of a buried cable or pipe, and such excavation involves a risk of damage or interference to the buried cable or pipe, unless the location of that buried cable or pipe is precisely known.

In particular, the growth in the use of fibre-optic communication systems for telephones, cable television, etc has significantly increased the problems associated with excavation. Such fibre-optic communication systems have a much higher communication capacity than metallic conductors, but the costs consequent on damage or interference to the fibre-optic communication system are significant. Moreover, if damage occurs, it is more difficult to repair a fibre-optic connection than it is to repair a metallic connection. For this reason, owners and/or operators of fibre-optic communication systems normally require that, before any excavation can occur in the vicinity thereof, the location of the fibre-optic connection should be determined precisely, both by suitable location system and by visual inspection. In practice, this means that an initial excavation needs to be made to permit the official inspection of the cable, before any more extensive excavation can be carried out in the vicinity. Moreover, each preliminary location and excavation to enable the fibre-optic connection to be inspected must be repeated along the length of the fibre-optic connection, and this requires a significant amount of time and effort.

One type of conventional locator detects alternating fields from signal currents in a conductor, by means of a suitable antenna assembly incorporated in a hand-held receiver. Such an arrangement is applicable to fibre-optic connections because such connections normally have a metal sheath for protection purposes, and a signal can be applied to that metal sheath and detected.

In such conventional systems, a user carries the receiver and repeatedly makes measurements adjacent the target conductor until the receiver indicates that the conductor is present. Then, in order to obtain the visual inspection referred to previously, an excavation is made at the site determined by the locator, until the pipe, cable or fibre-optic connection is exposed.

SUMMARY OF THE INVENTION

In a first aspect of the present invention, a locator is provided with at least two antennae of known separation, each antenna being able to measure electro-magnetic field components in the direction of the separation of the two antennas, and perpendicular to that direction to the object. Suitable processing means is then provided to derive co-ordinate information defining the direction and separation, of the locator relative to the conductor which generates the electro-magnetic fields. In the following specification, the direction corresponding to the separation of the antennas will be referred to as the X direction, and the perpendicular direction which intersects with the object will be referred to as the Y direction. Thus, the present invention derives X and Y co-ordinate information of the object relative to the locator.

Preferably, the locator is in the form of a ground penetration probe. Then, as the probe penetrates the ground, the antennae detect electromagnetic signals from a conductor of an underground object to be located, and can determine the position of the probe relative to the underground object. Thus, the probe can be driven into the ground towards the underground object and the user will be provided with information which indicates the separation of the probe from the object, to enable the probe to be brought into close proximity to the underground object without the risk of the probe damaging the underground object due to forceful impact.

In order to determine the separation of the locator from the object, at least two antennas must be provided at spaced-apart locations of the locator. The difference in electromagnetic fields detected by the two antennas then enable the distance from the locator to the object to the calculated, to generate suitable information to the operator. Preferably, three or more antennas are provided, as this then permits more accurate measurements to be made as the locator approaches the underground object by choice of sensing antennas utilized. This is particularly useful when the locator is a ground penetration probe, so the accuracy of location is improved as the probe approaches close proximity to the underground object.

At least in theory, the position of the object relative to the locator can be determined by assessment of the electromagnetic fields at the two antennae, and by calculations using simple trigonometry. However, in practice, it is likely that there will be asymmetries in the electromagnetic field generated by the conductor, for example because of the presence of other adjacent conductors, and therefore it is preferable that the processing means is provided with suitable compensation for such errors. Moreover, although it is possible to have antennae with coils of common centres, it is often more practical to have coils with displaced centers, in which case suitable compensation must be provided for this as well.

Although it is possible for each antenna to have two-axis coils, it is preferable that three-axis coils are provided since this enables further information to be derived which enables the inclination of the direction of extension of the object relative to the Y direction to be determined.

In a further development, the locator is provided with tilt sensing means which enables the inclination of the locator, and hence the X direction, to be determined relative to the vertical. The processing means then makes use of this tilt information, and it is then possible to derive a determination of the location of the object, in terms of its vertical and horizontal separation from the locator, independent of the orientation of the locator. This is important since it is not easy for any operator to ensure that the locator is held absolutely vertically.

This aspect of the present invention is applicable to the location of any conductive object from which an electromagnetic signal can be transmitted. As has previously been mentioned, the present invention is primarily concerned with the location of a buried fibre-optic connection, by applying signals to a metal sheath of such a connection and detecting the electromagnetic fields generated therefrom, but the present invention is not limited to this field of application.

As has been mentioned above, a locator with three or more antennae is preferred as it enables more accurate measurements to be made as the locator approaches the object. Since the position of the object relative to the locator can be determined by any pair of antennae, it is possible for the choice of antenna pair to be changed in dependence on the separation of the locator and the object. This switching between antenna pairs, when carried out automatically, represents a second independent aspect of the present invention.

Also as mentioned above, the locator of the present invention may have three-axis antennae which enable the relative position of the object located to be determined, but also the angle of inclination of the direction of elongation of the object relative to the Y direction. As a result, it then becomes possible to predict the magnetic field which will be generated by the object at a position close to, but separated from, the current position of the locator. If the locator is then moved to that position, and the field measured, the correspondence between the measured field and the predicted field gives a measure of the confidence level of the measurement. This operation may be carried out by moving the locator to a predetermined lateral displacement. However, a similar effect can be achieved by changing the inclination of the locator relative to the vertical. Since that change in inclination can be measured by a tilt sensor, it is then not necessary to move the locator by a predetermined amount, because the tilt sensor can then determine any change in inclination. This simplifies the actions needed by the operator, since the operator merely needs to change the angle of the locator relative to the vertical in order to make a measurement of the degree of confidence in the location of the object. This way of obtaining a confidence measurement, by moving the locator, therefore represents a third independent aspect of the present invention.

If the locator is a ground penetration probe, it will be normal for the probe to be a drilling device which is driven into the ground at the approximate location of the underground object by the operator. Using the information from the antennae, the locator can bring the probe hip into close proximity to the underground object, since the operator is provided with information relating to the separation therebetween, and can control the movement of the probe appropriately.

The probe may have an outer sheath from which the rest of the probe can be removed. Then, the probe together with the sheath is inserted into the ground until the buried object is reached, and then the rest of the probe removed from the sheath to permit access for inspection or maintenance. For example, an endoscope may be inserted into the sheath to give visual information about the underground object. The sheath may be left in place for subsequent access, or as a marker.

Alternatively, the probe leaves a hollow since this permits visual inspection of the underground object by endoscope or other inspection means inserted into the space left by the probe once the probe has been brought into close proximity with the underground object and removed from the ground.

Where the probe is a drilling device, the information from the antennae may be used to control the drilling force. For example, when the probe is a long way from the underground object, the drilling force can be large so that the probe moves rapidly towards the underground object. As the probe approaches the underground object, and to prevent forceful impact, the drilling force may be reduced so that the drilling force is minimal as the probe reaches the immediate vicinity of the underground object.

In the aspects of the present invention discussed above, antennae detect signals from the object. Normally, signals are applied to a conductor of that object from a separate transmitter. However, if such a system is applied to the location of underground objects using a ground penetration probe, there is a risk that there may be other objects which could be hit by the probe as the probe penetrates the ground. For nonmetallic objects, this problem can be resolved by providing other sensing means, e.g. radar or accelerometer, to enable probe movement to be halted on or just prior to impact with such an object. That other sensing means may also be used for specific sensing and/or locating tasks connected with solid objects. If the underground object has a conductor, however, it is possible for the probe to have a transmitter therein which transmits signals which induce further signals in the underground object, which further signals can then be detected. This may be useful, for example, where there is a dense network of different conductors at the site to be investigated.

Alternatively, the probe may detect and locate the underground object on the basis of signals already present on the object, for example 50Hz or 60Hz mains power or radio signals.

In a further development, the object may have one or more devices thereon which are able to transmit a predetermined signal. Such transmitters are known, in themselves from e.g. from animal husbandry, in which they are referred to as RFID systems. A locator is provided with means for detecting such devices, so further identification of the object can be achieved.

In the present invention, the relationship in space between the object and the locator is determined. Hence, with the present invention, it becomes possible to generate a visual display showing its spatial relationships thereof, rather than e.g. by a audible signal which varies its frequency. Such a generation of a visual display is therefore a fourth aspect of the present invention.

In this fourth aspect, the operator of the locator e.g. a ground penetration probe may make use of the visual display in order to control the movement of the locator. Where the locator is a ground penetration probe e.g. a drill, the user may alter the display and change the direction of movement of the drill so that the drill approaches the underground object. The user can therefore ensure that the drill is at all times targeted towards the underground object. Since the user is presented with a visual display of the separation (and it may be possible for that display to change in magnification as the probe approaches the object), it would be possible for the user to stop the movement of the probe very close to the object. However, it is preferable, as previously described, that there is automatic control of the speed of movement of the probe in accordance with the second aspect of the present invention, to reduce the risk of accidental damage to the object.

The visual display of this fourth aspect is preferably a head-up display which presents the spatial relationship of the probe and the underground object in the normal line of sight of the user. This has the advantage that the user may simultaneously view that display and at the same time see the movement of the probe.

Indeed, such a head-up display may be applied to other types of locators and is thus a fifth independent, aspect of the present invention.

It is often the case that a site to be investigated has a plurality of adjacent objects. For example, the need for cables of different utilities to follow similar routes means that it is often necessary for the operator of a ground penetration probe to be aware of all the underground objects at the particular site. If all the underground objects generated the same electromagnetic signals, the antennae of the locator would simply record the composite field generated. However, if the different signals are applied to the different underground objects, for example signals of different frequencies, then it is possible for the locator to distinguish between the different objects by suitable modulation of the signals received. Hence, by suitable analysis, it is possible to determine the separation of the locator from each of the underground objects, and for each underground object to be displayed on the display. Hence, the operator is then presented with information showing the location of all the underground objects at the site. This is important, for example, in ensuring that the ground penetration probe approaches only the underground object of particular interest, and avoids other underground objects. Because the operator is presented with a visual display showing the relevant positions of the objects, because their positions relative to the locator are known, it is possible for the operator to bring a ground penetration probe into close proximity with one underground object, while avoiding contact with other underground objects at the site.

As an alternative to applying different signals to the underground objects, which is not always practical, the underground objects at the site may be distinguished if they each carry active markers as described previously, with each active marker generating a coded signal which identifies the particular underground object. Since the locator can then detect information which identifies the number of underground objects at the site, the locator can then resolve signals it receives into different components corresponding to the different objects.

As has previously been mentioned, the ground penetration probe is driven into the ground towards the underground object. For very soft ground, this could be done simply by the user applying force to the ground penetration probe, but preferably a mechanical drive is provided.

According to a sixth aspect of the present invention, that drive is provided by contra-rotating masses. If two masses are driven at angular velocities, about a pivot point, there will be a net force on the pivot point which is determined by the phase between the two masses, and by the masses themselves. By suitable arrangement of the masses, and the phase therebetween, it is possible to arrange for the variation in force to be such that the downward force has a magnitude which is greater than any upward force, even if the time-average is zero. Then, bearing in mind that the penetration probe must overcome friction with the ground in order to move, the forces can be such that the downward force is sufficient to drive the ground penetration probe into the ground but the upward forces do not overcome friction sufficiently to drive the ground penetration upwards to the same extent, so that there is a net downward movement. Similarly, by altering the phase of rotation of the masses, it is possible to re-arrange the system so that the upward forces exceed the downward forces in magnitude, so that the ground penetration probe will be driven out of the ground. Preferably, two such pairs of masses are used to cancel-out lateral forces.

BRIEF DESCRIPTION OF THE DRAWINGS

Embodiments of the present invention will now be described in detail, by way of example, with reference to the accompanying drawings, in which.

DETAILED DESCRIPTION

As has previously been described, the various aspects of the present invention discussed above are based on the detection of the separation of a locator and an object. The present invention is particularly, but not exclusively concerned with the detection of the separation of a ground penetration probe and an underground object. The basic principles underlying such detection will now be discussed with reference to FIGS. 1 to 4

Figure 1:
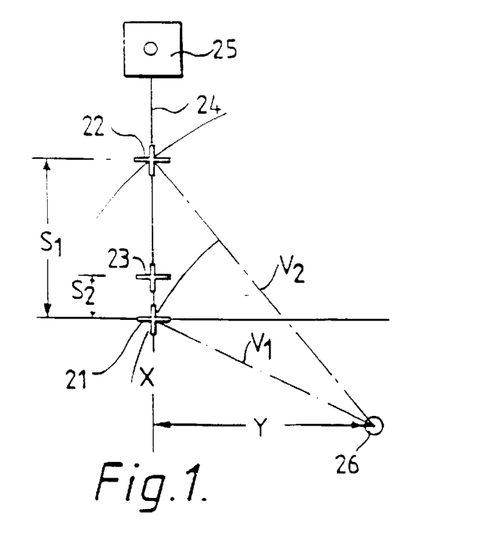
FIG. 1 is a schematic view from the side of the relationship between a ground penetration probe according to the present invention and an underground object.

Referring first to FIG. 1, a ground penetration probe 24 has three antennae 21, 22, 23 thereon. The antennae detect electromagnetic fields generated at an underground object 26, such as an underground conductor carrying current. The structure of antennae capable of detecting such radiation is, in itself, known and will not be discussed further.

One of the antennas 21 is located at, or a known distance from, the tip of the ground penetration probe 24, and the other two detectors 22, 23 are at known separations S1 and S2 respectively along the ground penetration probe 24 from the first antennas 21. The ground penetration probe 24 ensures that the antennae 21 to 23 have a known separation and fixed orientation so that signals detected thereby can be processed.

When the ground penetration probe 24 is moved into the ground proximate an underground object 26, which underground object carries an AC signal, electromagnetic fields will be detected by the antennas 21 and 22 enabling position vectors $V_1$ and $V_2$ to be calculated, and permitting the separation of the ground penetration probe 24 from the underground object 26 to be determined e.g. in terms of X and Y position coordinates. Such calculation may be carried out by a suitable processor 25 connected to the antennas 21 to 23 via the probe 24.

Thus, if:

B is the total field detected at antenna 21,

T is the total field detected at antenna 22,

Bh is the horizontal component at antenna 21,

Th is the horizontal component of the field at antenna 22,

Bv is the vertical component of the field at antenna 22, then the X and Y position co-ordinates are given by:

$$Y = \frac{SI \cdot \frac{Bh}{B}\left(\frac{Bh}{B} + \sqrt{\frac{B^2}{T^2} - \frac{Bv^2}{B^2}}\right)}{\frac{B^2}{T^2} - 1}$$

$$X = Y \cdot \frac{Bv}{Bh}$$

Since the X and Y co-ordinates can be calculated the position of vectors $V_1$ and $V_2$ can be calculated. These equations hold true for the simple case of a single conductor, and are given by way of example.

Figure 2:
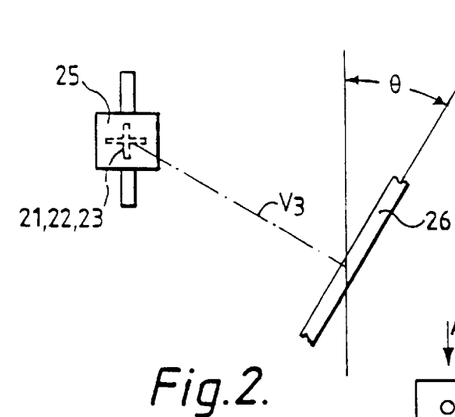
FIG. 2 corresponds to the ground penetration of FIG. 1, but viewed from above.

Furthermore, if the antennas 21 to 23 are each based on a three-axis orthogonal aerial system, it is also possible to obtain a third orientation vector $V_3$ as shown in FIG. 2, to derive the angle θ being the plan rotation of the ground penetration probe 24 relative to the underground conductor 26. Therefore, by knowing the X and Y coordinates and the angle θ, a user can be presented with information indicating the separation of the ground penetration probe 24, and in particular the tip thereof, from the underground object 26. The user may then direct the movement of the ground penetration probe 24 to reduce that separation, e.g. to bring the tip of the ground penetration probe 24 immediately adjacent the underground object 26.

Figure 3:
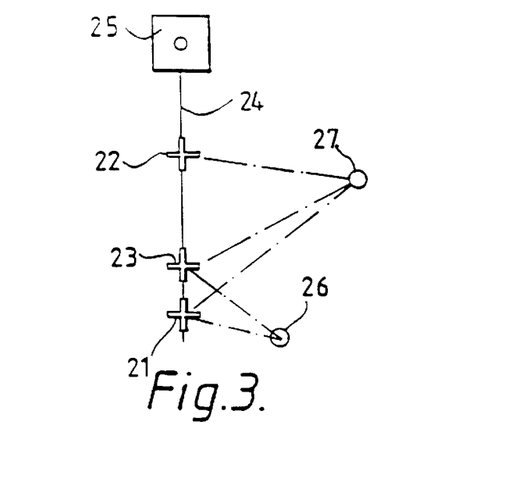
FIG. 3 is a schematic view showing measurement of the relationship between the ground penetration probe of FIG. 1 and two underground objects.

From the above description, it can be seen that only two antennas 21, 22 are needed in order to determine the separation of the tip of the ground penetration probe 24 and the underground object 26. However, as the tip of the ground penetration probe 24 approaches the underground object, it is possible that the determination of the separation makes use of the third antennas 23, as shown in FIG. 3. Measurements made on the first and third antennas 21, 23 then offer a more accurate measurement of the separation of the tip of the probe 24 from the underground object 26 when that separation is small.

Furthermore, FIG. 3 also shows that, as the tip of the probe 24 approaches the underground object 26, the effect of other generators of electromagnetic fields, e.g. object 27 is reduced since the antennae 23 is used only when the tip of the probe is close to the underground object 26. The change in ratio of antenna separation distance to underground object distance will reduce the relative effect of signals from object 27 enabling it to be identified as being other than the desired underground object 26. Furthermore, the known proximity of the underground object 26 also enables signal current direction and amplitude to be determined with greater confidence than if only wider spaced antennas are used.

As has previously been mentioned, the processor 25 determines the separation of the tip of the probe 24 from the underground object 26. Therefore, if the angle of orientation of the probe 24 is changed, this should not affect separation of the tip of the probe 24 from the underground object 26. Thus, if the ground penetration probe 24 is pivoted through an angle o from position A to B in FIG. 4, the measurement of the position of the underground object 26 should not change. Similarly, if the probe 24 is moved laterally, e.g. to the position C shown in FIG. 4, then the lateral movement from position A to C corresponds to the change in position of the object 26 relative to the probe 24. In other words, the object 26 should maintain its absolute position.

One possible impediment to the accuracy of derived positional information is tilt of the locator axis from true vertical. This may be countered by incorporation of a 2-axis tilt sensor of any suitable design giving electrical data corresponding to angular deviation from the vertical gravitational axis, from which the true location of the target object can be computer, by appropriate compensation of the locator data.

Figure 4:
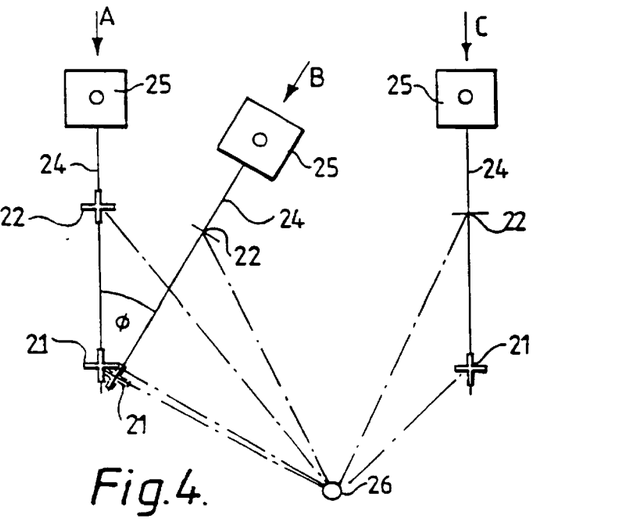
FIG. 4 shows the movement of the ground penetration of FIG. 1 relative to the underground objects.

A practical limitation of the locator system as described with reference to FIGS. 1 and 4 is that it uses antenna arrays having common centres and vertical axes. This is difficult to achieve in practice, even with spherical cores common to orthogonal coils; with separate solenoidal coils and cores, or corresponding magnetic field sensor arrays of other types, achievement of common centrality to a high degree of accuracy is impracticable. It is therefore preferable to incorporate mathematical compensation for the deviations from centrality of the coils of the antennae.

Another limitation to the accuracy of positional data from multi-antenna locators is perturbation of the magnetic field. It is therefore desirable to incorporate mathematical compensation for field perturbation of the sensed field, to increase the location accuracy, or establish a confidence level for the data derived.

The mathematical compensations needed to take into account deviations from the centrality of the close of the antennae and for field perturbation means that the equations referred to earlier to determine X and Y cannot be used. Instead, more complex equations are needed, as will now be described. Referring to FIG. 1, but assuming that the ground penetration probe 24 is inclined by an angle φ, then:

$$V_1 = \sqrt{x^2 + y^2}$$

$$V_2 = \sqrt{(x + S_1 \cos\phi)^2 + (y + S_1 \sin\phi)^2}$$

It is then possible to define the angle α to the cable from the antenna 21 and angle β to the cable from the antenna 22. Then the field in the vertical coil of antenna 22 is:

$$T_1 = \frac{I\cos(\pi - \beta)}{V_2}$$

where I is the cable current.

Similarly the field in one of the horizontal coils of coils of antenna 22 is:

$$T_2 = \frac{I\sin(\pi - \beta)}{V_2} \cdot \cos\theta$$

and the field in the other horizontal coil of antenna 22 perpendicular to the first horizontal coil is:

$$T_3 = \frac{I\sin(\pi - \beta)}{V_2} \cdot \sin\theta$$

Similarly, the field in the vertical coil of antenna 21 is:

$$B_1 = \frac{I\cos(\pi - \alpha)}{V_1}$$

The field in one of the horizontal coils of antenna 21 is:

$$B_2 = \frac{I\sin(\pi - \alpha)}{V_1} \cdot \cos\theta$$

and the field in the other of the horizontal coils of antenna 21 is:

$$B_3 = \frac{I\sin(\pi - \alpha)}{V_1} \cdot \sin\theta$$

Since the signals measured by the antennae 21,22 relate directly to the fields, those signals can be used directly in the calculations of cable position.

Thus, the total field T at the antenna 22 is:

$$T = \sqrt{(T_1^2 + T_2^2 + T_3^2)}$$

and the total field at the antenna 21 is:

$$B = \sqrt{(B_1^2 + B_2^2 + B_3^2)}$$

$V_1$ is then the solution to a quadratic equation, and hence there are two possible solutions:

$$V_1^{(1)} = \frac{S_1}{\left(\frac{B}{T} - 1\right)} \left( \sqrt{\frac{B_2^2 + B_3^2}{B}} + \sqrt{\frac{B_1^2 + B_2^2 + B_3^2}{T_1^2 + T_2^2 + T_3^2} + \frac{B_1^2}{B_2^2 + B_3^2}} \right)$$

$$V_1^{(2)} = \frac{S_1}{\left(\frac{B}{T} - 1\right)} \left( \sqrt{\frac{B_2^2 + B_3^2}{B}} - \sqrt{\frac{B_1^2 + B_2^2 + B_3^2}{T_1^2 + T_2^2 + T_3^2} - \frac{B_1^2}{B_2^2 + B_3^2}} \right)$$

The choice of which of solutions $V_1(1)$ and $V_2(2)$ is correct depends on the sign of the horizontal field at antenna 22:

$$V_2 = \frac{S_1}{\left(1 - \frac{B}{T}\right)} \left( \sqrt{\frac{T_2^2 + T_3^2}{T}} + \sqrt{\frac{T_1^2 + T_2^2 + T_3^2}{B_1^2 + B_2^2 + B_3^2} - \frac{T_1^2}{T_2^2 + T_3^2}} \right)$$

Thus, $$Y = (B_1 - T_1) \cdot \left[ \frac{V_1 \cdot V_2}{B \cdot V_2 - TV_1} \right]$$

$$X = \frac{V_1 \sqrt{B_2^2 + B_3^2}}{B}$$

The above calculations then need to be corrected if the axes of two horizontal coils do not intersect.

Define the sum $H_2$ of the horizontal fields in one direction at the two antennae 21,22

$$H_2 = B_2 + T_2$$

Similarly, define the sum $H_3$ of the horizontal fields in the perpendicular direction at the two antennae 21,22

$$H_3 = B_3 + T_3$$

Then $\theta$ is the arctan of the ratio of $H_2$ and $H_3$.

Then the correction to X needed if the axes of the two coils are displaced by a distance d is:

$$X\text{corr} = X + d\sin\theta$$

These differences are then corrected for the probe tilt to give the vertical distance D from the lower sensor 21 to the cable 26 and the horizontal distance H from the lower sensor 21 to the cable 26

$$D = X\cos\phi + Y\sin\phi$$

$$H = X\sin\phi + Y\cos\phi$$

Figure 5A:
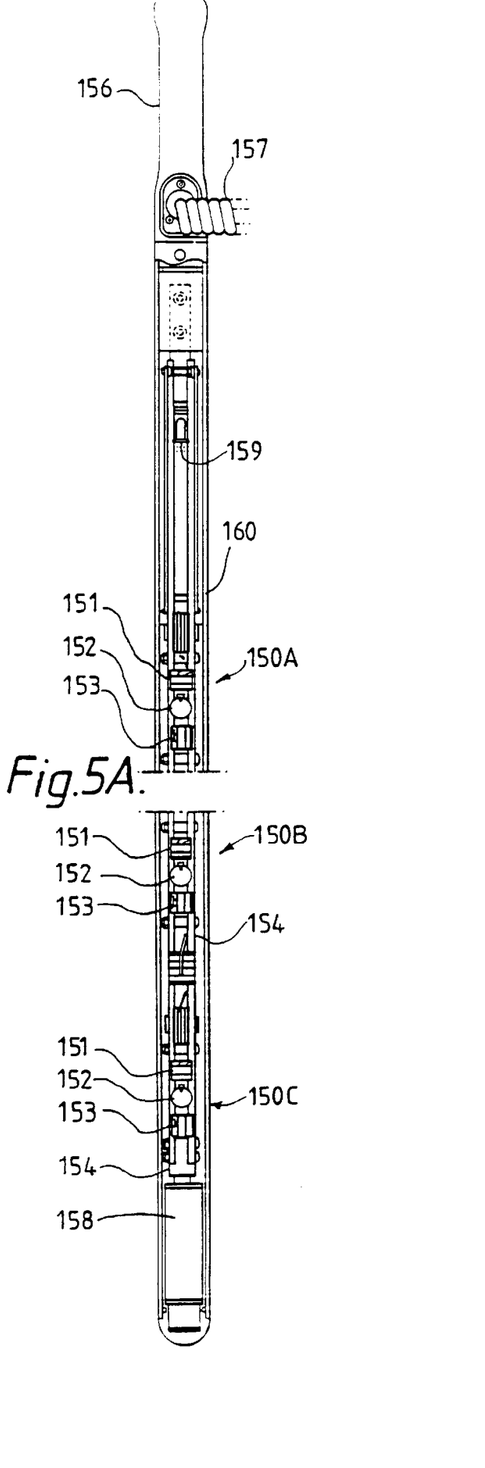
FIG. 5A shows practical embodiment of the ground penetration probe of FIG. 1.
Figure 5B:
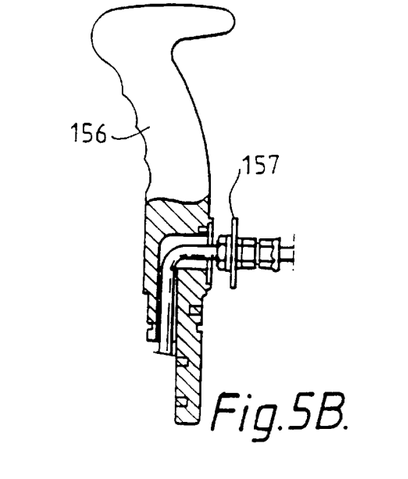
FIG. 5B shows in more detail the handle of the embodiment.
Figure 5C:
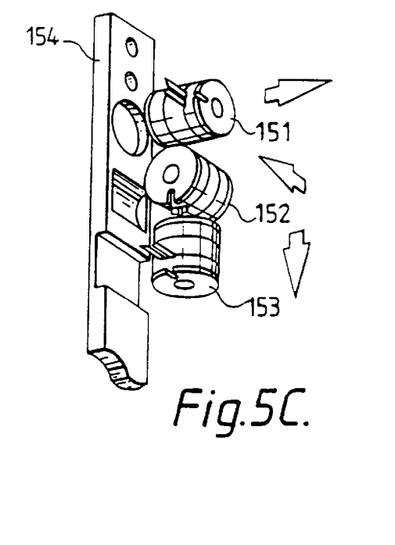
FIG. 5C shows in more detail the arrangement of coils in an antenna in the embodiment of FIG. 5A.

FIGS. 5A to 5C show in more detail a practical embodiment of the ground penetration probe being an embodiment of the present invention.

In this embodiment, three antennae 150A, 150B and 150C are contained within the tubular housing 160, so that the separation between the antennae 150A, 150B and 150C is fixed. The antennae thus correspond to the antennae 21 to 23 in FIGS. 1 to 4.

Each antenna 150A, 150B, 150C, nominally horizontal coils 151 and 152 at about 90° to each other, and a nominally vertical coil 153. When designed for incorporation into the tubular housing 160 of small diameter such as a ground penetrating probe, the coils 151,152,153 have inevitably a low ratio of length to diameter, so that small dimensional variations result in significant departures from true perpendicularity. In addition, the vertical separation of individual coils in each antenna 150A, 150B, 150C means that the three axes of measurement are not on common centres, although the vertical separation of the three antennae from each other can be controlled quite accurately by the support structure 154. This is typically made from rigid plastic, incorporating appropriately positioned slots to accommodate the coils, as in detail FIG. 5C. The support structure 154 is firmly located within the outer tubular housing 160. This tube may have a handle 156 when used as a portable locator above the ground, or it may be the ground penetrating tube in drilling applications. The tubular housing 160 provides for electrical interconnections 157 (see FIG. 5B) and can also accommodate circuit boards and other sensing means as required, e.g. at 158, and tilt sensor e.g. at 159.

One possible sensor that could be used as a sensing means 158 in FIG. 5 is a sensor designed to interrogate markers of the transponder type. Technology of such markers is known as such, and the sensor interrogates the marker in a way which identifies the marker. The marker incorporates a transponder tuned to a specific carrier frequency. The sensor 158 in the locator then transmits energy to the transponder which is converted by induction in the transponder, using a tuned pick-up coil, to power a re-transmitting circuit of the marker. The output of the re-transmitting circuit is at the carrier frequency, but is modulated by appropriate means within the marker to encode data identifying the marker, and hence the object to which the marker is attached. The modulation is decoded by a receiving circuit of the sensor 158. Once the marker has been identified, an appropriate display may be generated as will be described in more detail later.

It was mentioned above that, if the probe 24 in FIGS. 1 to 4 is moved laterally, or pivoted, the measurement of the position of the underground object 26 should not change. This enables the degree of confidence of the location of the underground object 26 to be measured easily. Referring to FIG. 4, suppose that a measurement is made of the position of the underground object 26 at position A, and the ground penetration probe 24 is then moved by a known amount to position C. If the processing means of the locator is aware of the lateral separation of positions A and C, the measurement at position A should enable a prediction to be made of the result of the measurement at position C. Since the location of the object 26 does not change, since the separation of positions A and C is known, the fields measured by the antennae 21,22 at position C is predictable. Therefore, if the probe 24 is moved to position C, and measurements made, a comparison can be made between the actual measurements at position C and the predicted measurements from the measurement at A. If these coincide, there is a high degree of confidence that the object 26 has been located accurately. If, however, there is a substantial divergence between the predicted measurements at C and the actual measurements at that position, the accuracy of location of the object 26 is questionable, so there is then a low degree of confidence. This procedure requires the lateral separation of positions A and C to be known. The user of the ground penetration probe 24 must therefore move that probe 24 by that known amount. This may be inconvenient, or difficult to achieve practically. However, a similar effect can be achieved by pivoting the probe 24 through the angle $\phi$ from position A to B in FIG. 4. Again, assuming that measurements are made in position A, it is possible to predict the results of the measurements made in position B, assuming that the angle is known. It is then possible to measure angles by using the tilt sensor described with reference to FIG. 5, and that measurement of the angle can be applied to the prediction. As a result, it is not necessary for the user to move the probe 24 by a known amount, since the angle of tilt can be measured independently by the tilt sensor. As a result, the user determines the position of the object 26 at the position A, tilts the probe 24 by any suitable amount $\phi$ and the processing means then calculates the predicted measurements based on the measured angle of tilt $\phi$, and at the same time determines the actual measurements at that angle of tilt $\phi$. This permitting the actual and predicted measurements to be compared to give a measure of the degree of confidence of the measurement.

Figure 6:
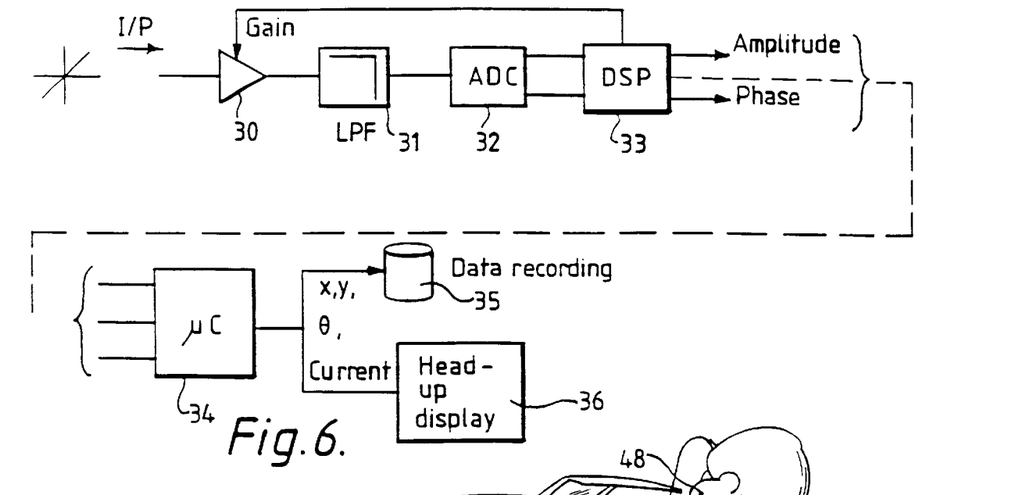
FIG. 6 shows a signal processing system for use with the ground penetration probe of FIG. 1.

FIG. 6 shows the signal processing system in each antennae 21 to 23. The signal IP from the corresponding antennae 21 to 23 is passed via an amplifier 30 and a low pass filter 31 to an analog-to-digital converter 32. The low pass filter 31 eliminates unwanted frequencies in the signal, so that the signal generated by the analog-to-digital converter 32 may be passed to a digital signal processor 33 to permit amplitude and phase signals to be generated. FIG. 6 also shows that the digital signal processor 33 can be used to control gain of the amplifier 30. Amplitude and phase signals thus generated from each of the antennae 21 to 23 are passed to a microcomputer 34 which calculates the X, Y and θ measurements defining the relationship between the probe 24 and the underground object 26, and may be stored in a suitable recording system 35 and/or used to generate a display 36 (e.g. a head-up display).

Figure 7:
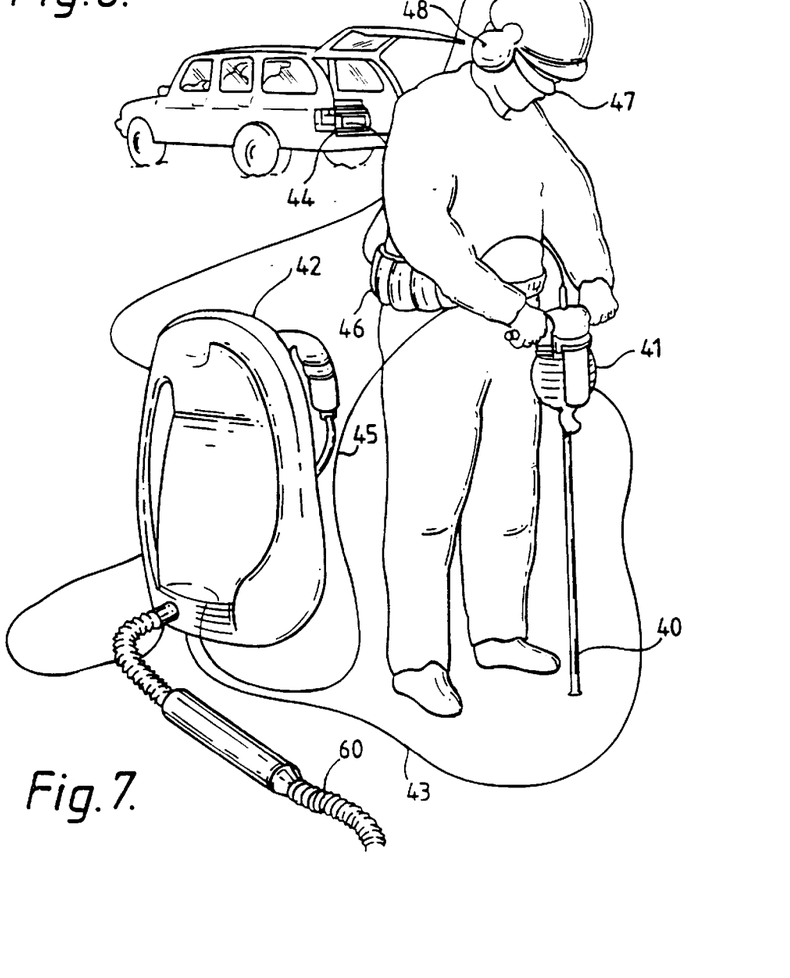
FIG. 7 shows a schematic view of a detailed embodiment of a locator embodying the present invention.

Another embodiment of the present invention is illustrated in FIG. 7. In this embodiment, the ground penetration probe is a drilling bar 40 which is driven from a tool head 41. The drilling bar 40 contains the antennas 21 to 23 described previously, but those antennas are contained within the drilling bar 40 and are therefore not visible in FIG. 7. The tool head 41 receives power via a base station 42 and power line 43, the base station 42 either containing its own power source or being powered from a separate power supply 44. That separate power supply 44 is vehicle-mounted in the embodiment of FIG. 7, so that the whole system is transportable. The base station 42 also contains the processor 25 described previously, with the processor receiving signals from the antennas in the drilling bar 40 via a line 45 which is also connected to a pack 46 on the belt of the user. Thus, the processor may send signals via the line 45 and the pack 46 to a head-up display 47 to permit the user to obtain an immediate visual indication of the separation of the tip of the drilling bar 40 from the underground object.

The base unit 42 may be equipped with suitable memories to store data derived from the antennae, to provide a more permanent record of the movement of the drilling bar 40 relative to the underground object. If the system is also arranged to provide warning of other sources of electromagnetic fields, or also a warning of close proximity of the drilling bar 40 to the underground object, these may be passed to the base unit 42 via the line 45 and the pack 46 to earphones 48 for the user.

The powering of the drilling bar 40 by the tool head 41 will now be described with reference to FIGS. 8 to 10.

Figure 8:
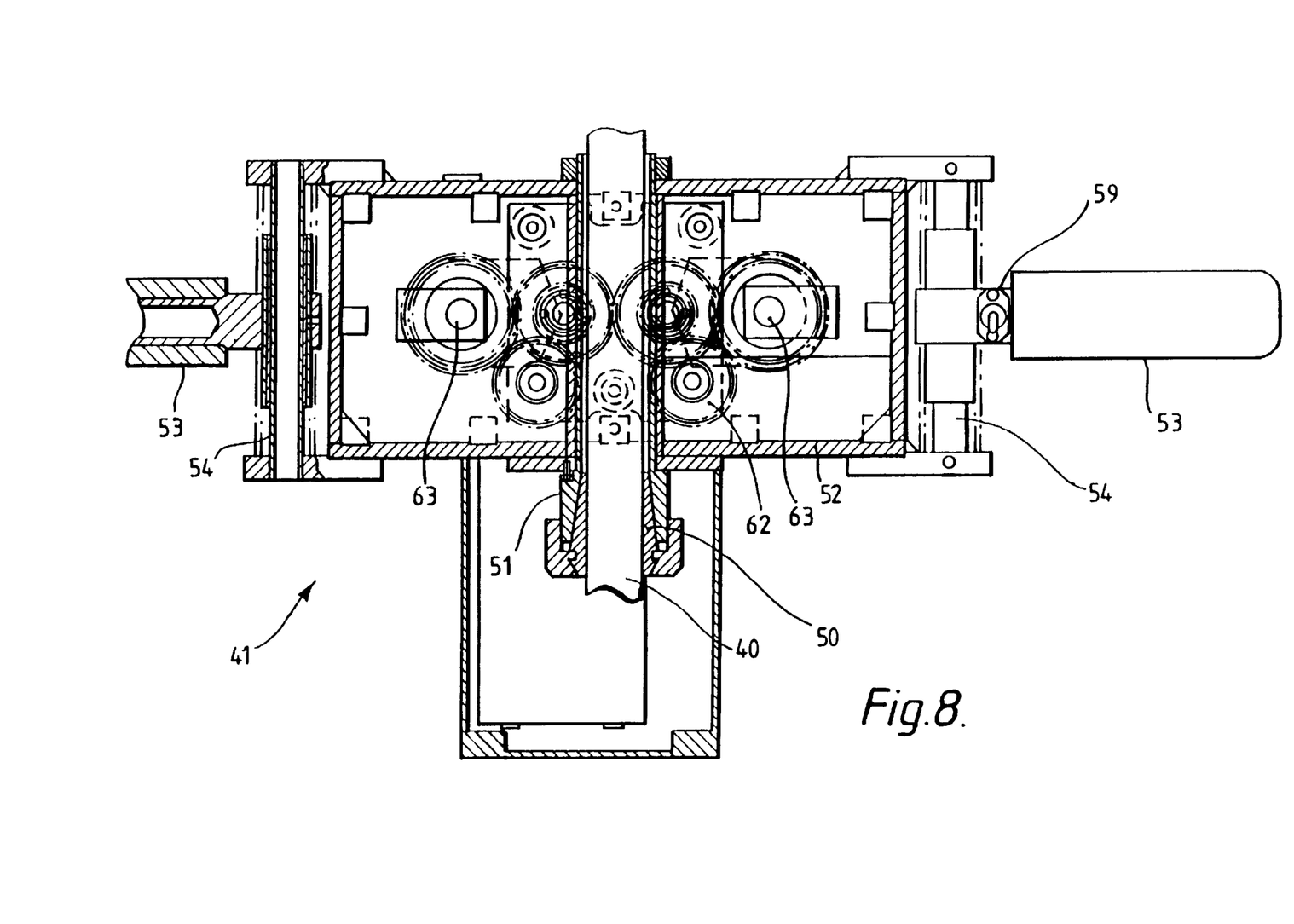
FIGS. 8 to 10 are views of a tool head in the embodiment of FIG. 7, FIG. 8 being a transverse sectional view, FIG. 9 being a sectional view in plan, and FIG. 10 being a side view, partially in section.

The sectional view of FIG. 8 shows that the drilling bar 40 is clamped by a collet 50 to a hollow shaft 51 which is rigidly fixed to the casing 52 of the tool head 41. Handles 53 are resiliently attached to the casing 52 via torsion assemblies 54. In FIG. 8, the handle 53 and torsion assembly 54 on the left-hand side are shown in section, whilst the handle 53 and torsion assembly 54 on the right-hand side are shown from the exterior thereof. The torsion assemblies 54 reduce vibration passed to the user from the drilling head 41. A control switch 55 is preferably provided adjacent one of the handles 53 to permit the user to control the action of the drilling bar.

Figure 9:
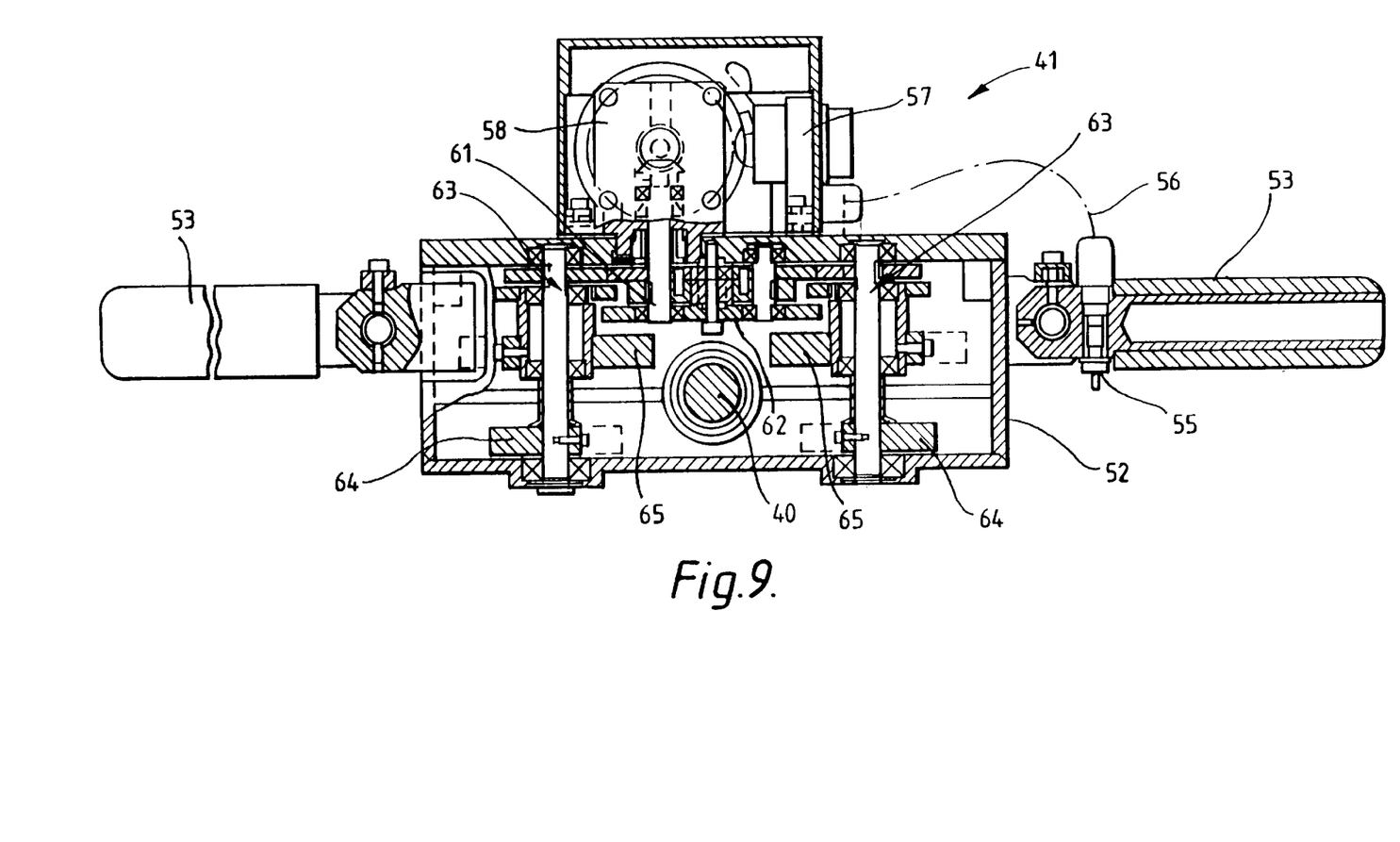
Figure 10:
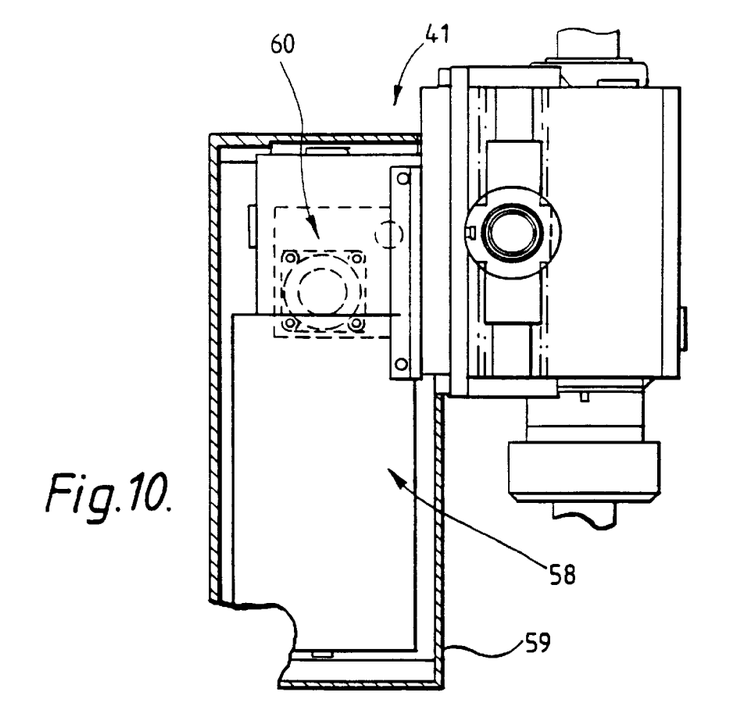

As can been seen from FIG. 9, which shows the tool head 41 in plan view, the switch 55 is connected via a wire 56 to a control unit 57 which controls a motor 58. The motor 58 is also shown in the side view of FIG. 10, which illustrates the separate casing 59 for the motor 58, and also the right-angle gear box 60. That gear box 60 connects the motor 58 to a shaft 61 which is coupled by a gear train 62 to a pair of contra-rotating shafts 63. Those shafts 63 are each rigidly coupled to an eccentric 64 and by lost-motion to a phased eccentric 65. The purpose of the use of lost-motion is to alter the net effect of the rotation of the eccentrics to vibrate the casing 52 of the tool head 41 so as to drive the drilling bar 40 downwardly or upwardly according to motor direction.

The principle of the drive system will now be explained with reference to FIGS. 11a, 11b and 12a and 12b.

Figure 11A:
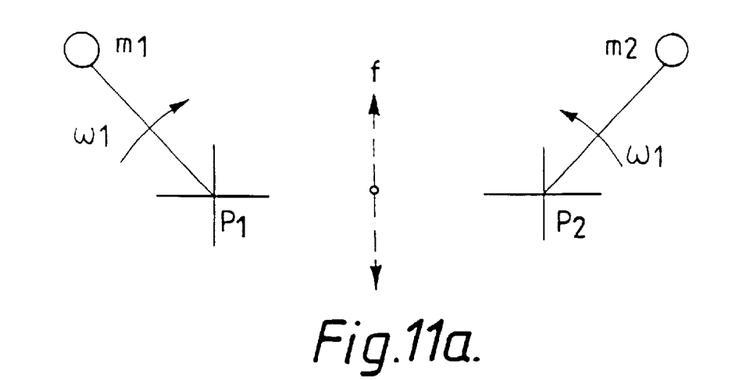
FIGS. 11a and 11b illustrate the movement of masses in the eccentrics in the tool head of FIGS. 8 to 10.
Figure 12:
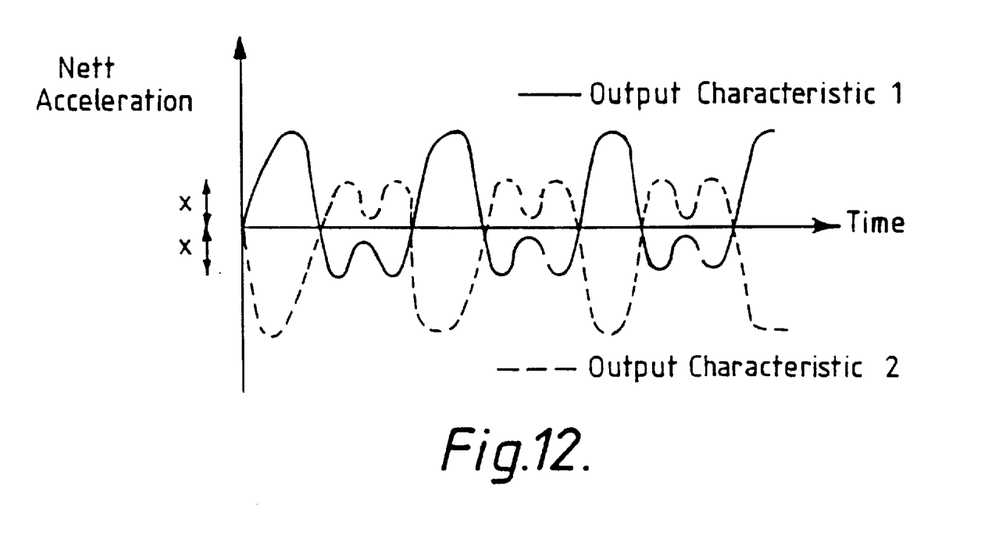
FIG. 12 is a graph showing the acceleration characteristics that are then achieved in the tool head of FIGS. 8 to 10.

Consider first the case show in FIG. 11a, in which masses m1 and $m_2$ are rotated with the same annular velocity ω, but in opposite directions, about respective axes $P_1$ and $P_2$. Then, there is a net force f generated on the support zone at axis $P_1$ and $P_2$ which varies sinusoidally.

Figure 11B:
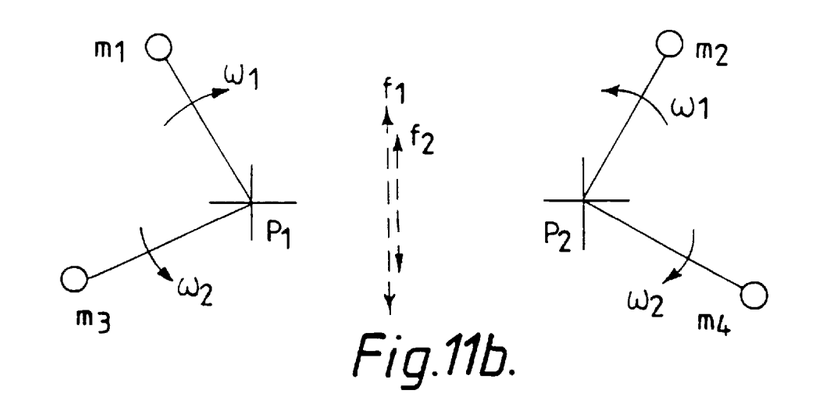

Next, consider the case where there are two further masses $m_3$ and $m_4$ rotating respectively about the axis $P_1$ and $P_2$, with an angular velocity of $\omega_2$ and in opposite directions. Then, as shown in FIG. 11b, a force $f_2$ is generated which is again sinusoidal. The net force then depends on the masses and angular velocities, which determines the phase of the rotation of the masses.

Since forces $f_1$ and $F_2$ are both sinusoidal, it is evident that the net force over a whole cycle will be zero. At first sight, therefore, the ground penetration probe will not move. Hover, this does not take into account the friction between the ground and the ground penetration probe, which must be overcome before any movement occurs. It is then possible to arrange for the maximum force to be either up or down, and since the maximum force will then overcome friction by a greater amount than other forces, this will impose a net movement on the ground penetration probe.

In this embodiment of the present invention, axes $P_1$ and $P_2$ correspond to the shafts 63, and masses $m_1$ and $m_2$ are equal, as are masses $m_3$ and $m_4$. Moreover, assuming masses $m_3$ and $m_4$ are smaller, $\omega_2$ is twice $\omega_1$.

Suppose further that phases between the masses is chosen so that there is a point in the cycle which masses $m_1$ and $m_3$ are simultaneously directly above point $P_1$ and similarly masses $m_2$ and m4 are directly above point $P_2$. The resulting acceleration profile is then shown by the solid line in FIG. 12. FIG. 12 shows that the upward acceleration has a maximum value which is greater than the downward acceleration at any time of the cycle, although the time averaged acceleration over a whole cycle will be zero. Then, account must be taken of the friction that will exist between the ground penetration probe and the ground. Suppose a net acceleration of x in FIG. 12 is needed to overcome the friction. It can then be seen from FIG. 12 that the upward acceleration is sufficient to overcome the frictional resistance, so that the ground penetration probe moves upwardly. The downward acceleration, however, is never sufficient to overcome the friction and thus there is net movement of the ground penetration probe. Similarly, by arranging for the phases of the masses to be such that masses $m_1$ and $m_3$ are aligned directly below the point $P_1$ and the masses $m_2$ and $m_4$ are directly aligned below the point $P_2$, the net acceleration then corresponds to the dotted line in FIG. 12. It can readily be appreciated that the downward acceleration overcomes the frictional force, thereby imposing movement on the ground penetration probe, whereas the upward force does not.

Hence, by suitably controlling the phases between the masses, upward or downward movement of the ground penetration probe can be achieved by the effect of the rotating masses and their interaction with frictional forces.

Referring again to FIG. 7 the head-up display 47 gives a visual display of the relative positions of the ground penetration probe on the underground object. The structure of that head-up display may correspond to that display produced by Fraser-Nash Technology Limited, in which an image is projected on to a semi-transparent spherical mirror so that the light from the mirror is collimated and is thus perceived by the viewer as being at a distance.

Figure 13:
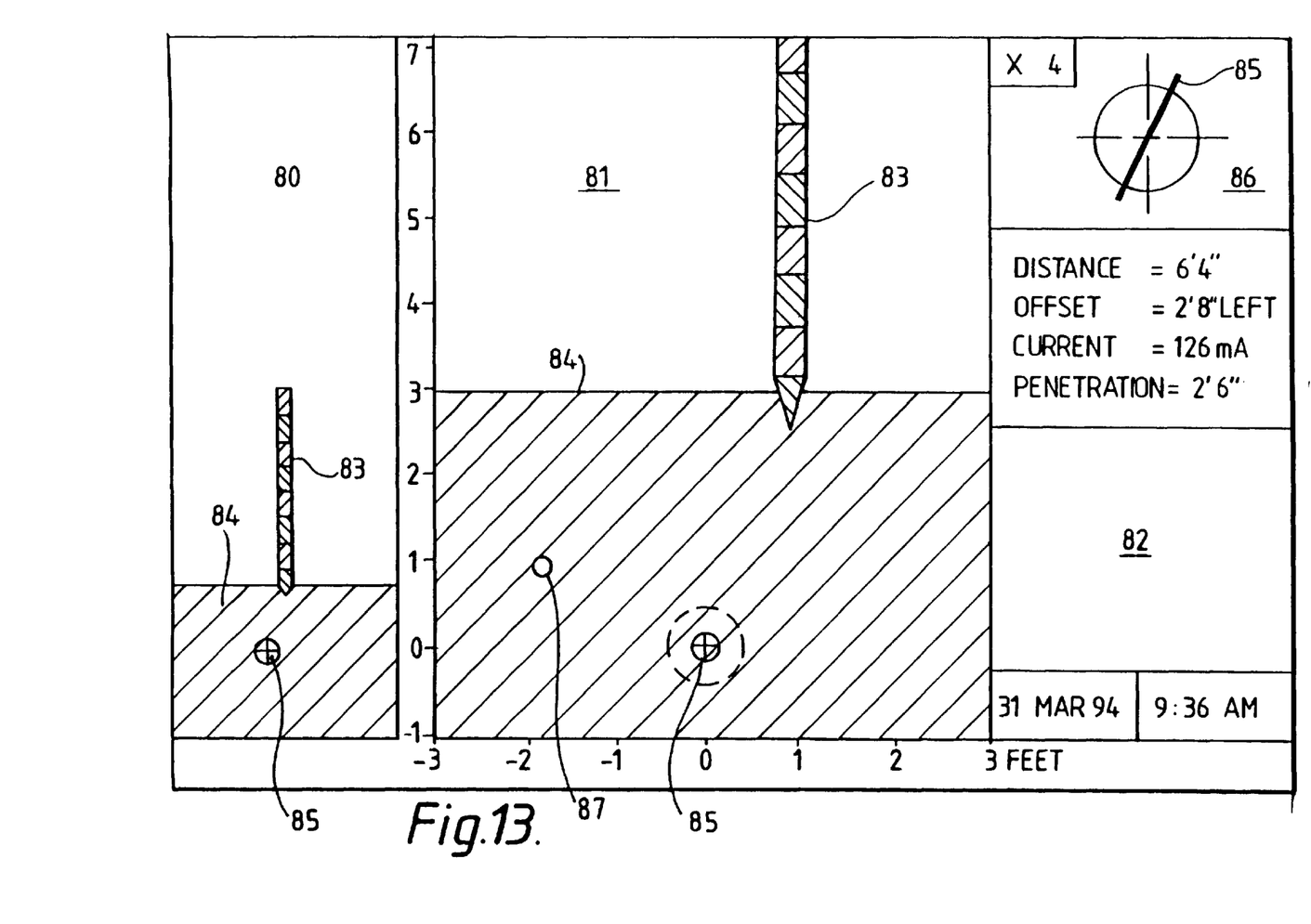
FIG. 13 is a schematic view of the display generated by the head-up display of the location of FIG. 7.

The display that may be generated with the present invention is shown in FIG. 13. The display has three windows 80, 81 and 82. Window 81 is a magnified view of the image appearing in window 80, around the tip of the ground penetration probe. Each of the windows 80 and 81 display an image 83 of the ground penetration probe, a region 84 corresponding to the ground, and an image 85 of the underground object. Thus, the user can see the approach of the image 83 of the ground penetration probe towards the image 85 of the underground object, and can therefore control the movement of the ground penetration probe 24 to ensure appropriate movement of the ground penetration probe 24 into the ground towards the underground object 26. Hence, the user can see, in his direct line of sight, images corresponding to the separation of the ground penetration probe 24 and the underground object 26. The image for the window 80 may be generated using antennae 21 and 22, whereas the image for the window 81 may be generated using the antennae 21 and 23.

The window 82 has a first region 86 which gives a plan view of the image 85 of the underground object relative to the longitudinal axis of the ground penetration probe, and also gives numerical data relating to the separation of the ground penetration probe 24 and the underground object 26.

In order for the region 84 in FIG. 13 corresponding to the ground to have a surface which is horizontal, it is then useful for the probe to contain a tilt sensor, since the information from that tilt sensor may then be used in the generation of the display shown in FIG. 13. If the probe is not maintained in a horizontal position, the information from the tilt sensor can then be used to incline the image 83 relative to the region 84. This may be useful not only to give the user a warning that the probe is inclined, but also permits the user to steer the probe if an inclined approach to the object is necessary, because of difficulty of access to the surface directly above the object. In the absence of such a tilt sensor, the user must maintain the probe vertical, but this can be achieved by e.g. a spirit level on the probe itself. However, in that case, the display shown in FIG. 3 will not respond to the tilting of the probe and the boundary of region 84 corresponding to the surface will then always be perpendicular to the image 83, even if the probe itself is not vertical. This will not affect the display of the approach of the probe to the object, corresponding to the approach of the image 83 towards the image 85, but the display of FIG. 13 will then give a less useful guide to the true position.

One possible problem which may arise when a ground penetration probe is driven into the ground towards underground cable is that there may be other underground objects, such as other utility cables, in the immediate vincity. If all are generating electromagnetic signals, the resulting signals detected by the antennae of the ground penetration probe will correspond to the composite signal detected, thereby giving an inaccurate measurement of the position of the underground object of interest. The fact that the measurement is faulty will be detectable by moving the ground penetration probe a predetermined distance, or by tilting it, and comparing the predicted and measured locations of the object, as previously described. However, although the operator will then know that the underground object has not been located accurately, he would not be able to make an accurate location of it. However, if each underground object at the site to be investigated carries alternating currents of different frequencies, the electromagnetic signals generated by each underground object will similarly be at a different frequency, and therefore resolvable by modulation at the locator. Therefore, if the operator applies, by a suitable power source, alternating currents of different frequencies to each underground object at the site to be investigated, the locator can then determine the separation, in terms of both X and Y coordinates, of the locator and each underground object. Moreover, since the positions of all the underground objects are known relative to the locator, they are also known relative to each other. Hence, the display shown in FIG. 13 may display more than one underground object. The image of such a second underground object is shown at 87. Hence, by applying different signals to the underground objects at the site to be investigated, the operator of the ground penetration probe may be presented with a display showing the position of all the objects at the site, so that the ground penetration probe can be controlled so as to approach the underground object of interest, and to avoid all the others.

As a further alternative, each underground object may carry an active marker. Such active markers are known in themselves, and have a transponder tuned to a specific carrier frequency. When the transponder receives a signal at that carrier frequency, the energy is converted by induction in a tuned pick-up coil to power a re-transmitting circuit of the transponder to generate an output, that output being frequency modulated at the carrier frequency, so that it carries encoding data identifying the active marker, and hence the object to which it is attached. If each underground object at a site carries such an active marker, and each active marker is tuned to a different carrier frequency, then the active marker of any one object can by triggered to identify itself by the input of a signal at the carrier frequency generated e.g. by the locator itself. Hence, the locator can identify the underground objects at the site, which again permits a visual display similar to FIG. 13 to be generated.

Although the embodiment of FIGS. 7 to 13 made use of a drilling bar to form the ground penetration probe, the present invention is not limited to use of such a drilling bar and other penetration probes such as blades may be used. Furthermore, although the driving of the ground penetration probe by a motor-driven system has been illustrated, other drive arrangements may be used to generate a hammering or vibrating action, such a pneumatic, hydraulic, or electric arrangement. The drilling bar may have a mechanical stop to limit the penetration thereof into the ground to a predetermined depth. It may also have means for attaching a sleeve thereto, particularly when the ground is soft, to prevent collapse of soil and maintain visual access. Indeed, suitable vacuum extraction means 60 (see FIG. 7) may be provided to remove material from the site of ground penetration, to clear a finer layer of material immediately adjacent the underground object.

Figures 14, 15:
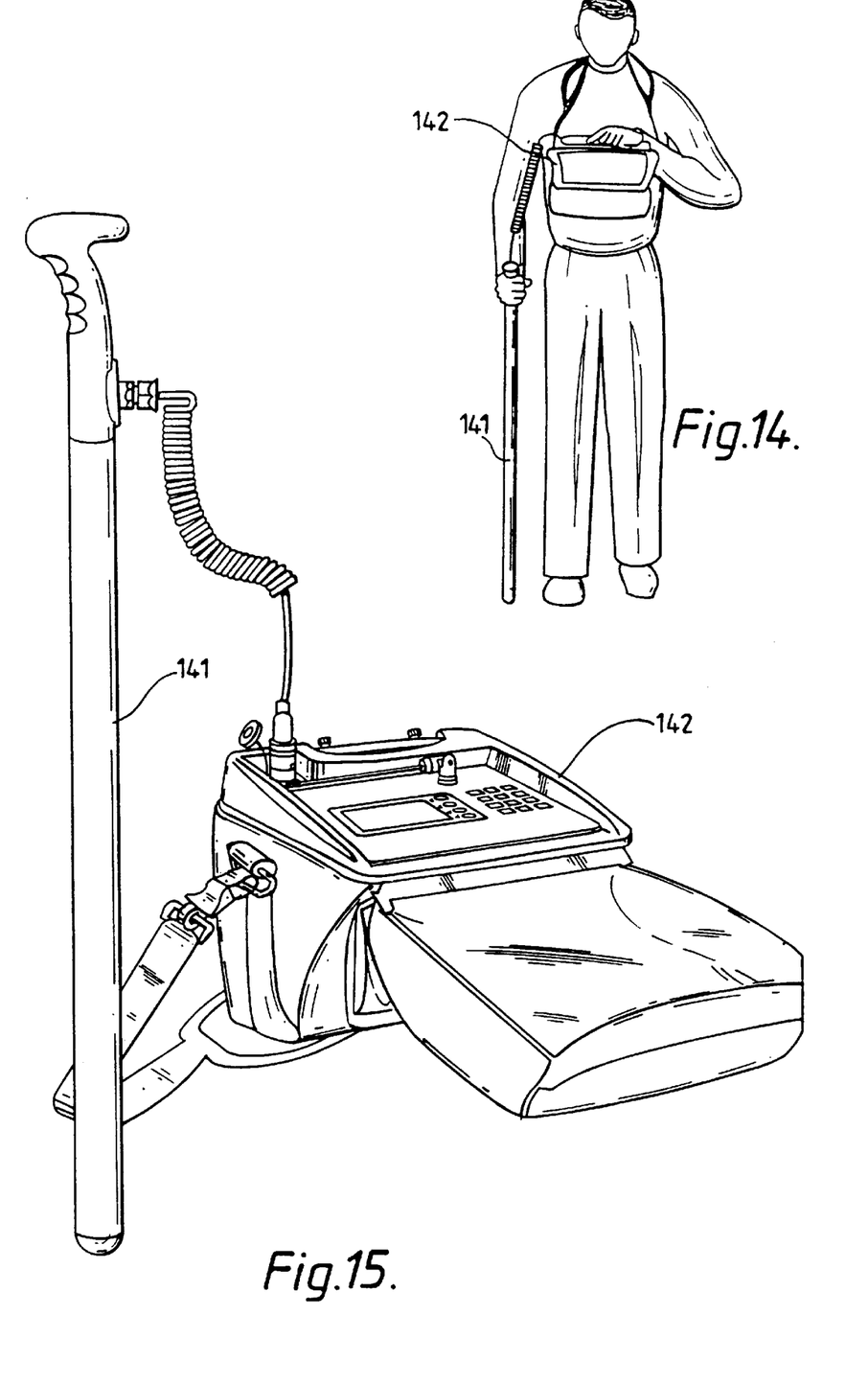
FIG. 14 shows a portable locator being a further embodiment of the present invention.
FIG. 15 shows in more detail the locator and display unit of the embodiment of FIG. 14.

FIG. 14 shows the use of a portable locator, being an alternative to the drilling probe of FIG. 7. It comprises a locator 141 corresponding generally to the embodiment of FIG. 5, and a signal processing and display unit 142, typically supported by shoulder and/or waist straps; they are shown separately in FIG. 15.

Figure 16:
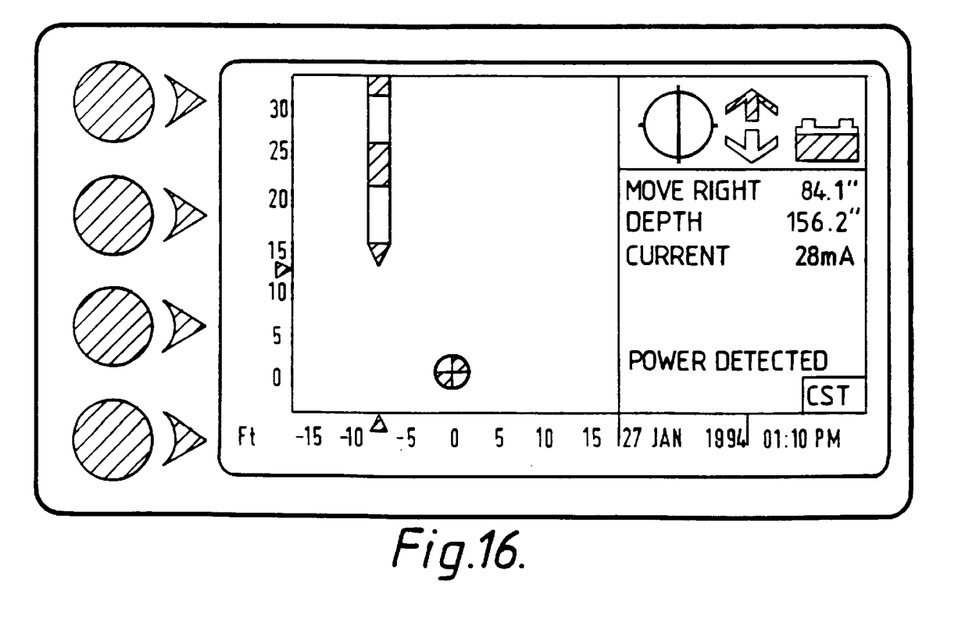
FIG. 16 shows a typical display generated by the display unit of FIG. 15.

FIGS. 16 shows a typical form of display by display unit 142, showing a vertical cross-section of ground and locator, with positional data regarding separation of target line and locator.

While the foregoing has described the primary application of the locator to subsurface objects, it may be applied equally to elongate conductors on or above the surface, e.g. to follow a guidance cable.

We claim:

1. A locator comprising:
   a ground penetration probe having at least two antennae therein with a predetermined separation therebetween, the antennae being arranged to detect electromagnetic signals from a conductor of an object;
   means for analyzing the electric signals to determine the separation of the locator and object both in the direction (x) of the separation of the antennae and the direction (y) transverse thereto; and
   means for controlling the drilling force of the round penetration probe depending on the separation of the ground penetration probe and the object.

2. A locator according to claim 1, wherein the ground penetration probe further comprises a removable sheath for receiving said probe.

3. A locator according to claim 2, having three antennae.

4. A locator according to claim 3, wherein the analyzing means is arranged to analyze the electromagnetic signals detected by a first and a second antenna of said three antennae when the locator and the object have a separation greater than a predetermined value, and to analyze the electromagnetic signals from the first and the third antenna of said three antennae when the locator and the object have a separation less than said predetermined value.

5. A locator according to claim 4, having a transmitter for inducing signals into the conductor of the underground object.

6. A locator according to claim 5, having means for generating a display showing the spatial relationship of the probe and the object, based on the electromagnetic signals.

7. A locator according to claim 6, wherein the analyzing means is arranged to predict the electromagnetic signals detectable by said antennae corresponding to a different separation of the locator and object.

8. A locator according to claim 7, further including a tilt sensor.

9. A locator according to claim 8, wherein the analyzing means is arranged to compensate for perturbations or asymmetries in the electromagnetic signals in determining the separation of the locator and the object.

10. A locator according to claim 9, wherein each antenna comprises at least two mutually perpendicular coils.

11. A locator according to claim 10, wherein each antenna comprises three mutually perpendicular coils.

12. A locator according to claim 11, wherein the axes of the coils intersect.

13. A locator according to claim 11, wherein the axes of any two coils do not intersect and the analyzing means is arranged to compensate for the relative displacement of the coils in determining the separation of the locator and the object.

14. The combination of a locator according to claim 13 and an object, the object having at least one active marker forming said conductor, said active marker being arranged to generate a coded signal, said locator having means for generating an input signal to said active marker for triggering said coded signal and means for detecting said coded signal from said active marker.

15. A locator according to claim 6, wherein the means for generating the display is a head-up display for an operator of the probe.

16. The combination of a locator according to claim 15 and at least two objects, each object having a conductor and each conductor generating electromagnetic signals, the electromagnetic signals of each conductor being different, wherein the means for generating a display is arranged to show the spatial relationship of the two objects.

17. A method of locating an object using a locator having at least two antennae, comprising the steps of:
   (a) detecting electromagnetic signals from a conductor of the object using said antennae when the locator is in a first position;
   (b) moving said locator from said first position to a second position; and
   (c) detecting the electromagnetic signals from the conductor of the object using said antennae when the locator is in the second position;
   wherein:
      the electromagnetic signals from the conductor of the object detectable by said antennae when said locator is in the second position are predicted on the basis of the electromagnetic signals detected in the first position; and
      the predicted electromagnetic signals and the electromagnetic signals detected when the locator is in the second position are compared.

18. A method according to claim 17, wherein the locator is tilted from the first position to the second position, and the tilt is measured by a tilt sensor, and the measured tilt is used in the predictions of the electromagnetic signals detectable by the locator in the second position.

* * * * *